(12) United States Patent
Gutierrez et al.

(10) Patent No.: US 7,213,000 B2
(45) Date of Patent: May 1, 2007

(54) RESERVE PRICE AUCTIONING

(75) Inventors: Arnold M. Gutierrez, Leander, TX (US); William K. Wittenbrook, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1147 days.

(21) Appl. No.: 09/852,831

(22) Filed: May 10, 2001

(65) Prior Publication Data

US 2002/0169705 A1 Nov. 14, 2002

(51) Int. Cl.
*G06Q 40/00* (2006.01)
(52) U.S. Cl. .............................. 705/37; 705/26; 705/27
(58) Field of Classification Search .................. 705/26, 705/27, 37
See application file for complete search history.

(56) References Cited

U.S. PATENT DOCUMENTS

| | | | |
|---|---|---|---|
| 5,905,975 A | * | 5/1999 | Ausubel ...................... 705/37 |
| 5,999,915 A | | 12/1999 | Nahan et al. .................. 705/27 |
| 6,041,308 A | | 3/2000 | Walker et al. ................ 705/14 |
| 6,085,169 A | | 7/2000 | Walker et al. ................ 705/26 |
| 6,230,147 B1 | * | 5/2001 | Alaia et al. ................... 705/37 |
| 2002/0103740 A1 | * | 8/2002 | Maroney ...................... 705/37 |

* cited by examiner

*Primary Examiner*—James Kramer
(74) *Attorney, Agent, or Firm*—David A. Mims, Jr.; Robert V. Wilder

(57) ABSTRACT

A method and implementing system are provided in which items are offered for auction sale at a network site to bidders who access the auction site. A seller is enabled to designate a reserve price as well as a number of automatic auction extensions to an initial auction period. If the designated reserve price for an item is not met during the initial auction period, and the seller has authorized a designated number of auction extensions, the auction is continued beyond the initial auction period and is automatically extended for the designated number of extensions until either a bid for the reserve price is received or the number of authorized extensions has transpired.

26 Claims, 3 Drawing Sheets

RESERVE PRICE AUCTIONING

FIELD OF THE INVENTION

The present invention relates generally to information processing systems and more particularly to a methodology and implementation for providing bid processing for network auction sales.

BACKGROUND OF THE INVENTION

One of the reasons for the increasing popularity and use of the Internet for sales transactions is the ease with which sales can be made using an auction model. In most cases, auction sales provide a ready sales outlet to a vast number of potential purchasers for a wide variety of goods. The auction model also provides an opportunity for a bidder to purchase a desired item for the lowest possible price. The present disclosure uses the Internet as an example of a communication network although it is understood that the methodology will readily apply to any network system.

Some "on-line" auctions, have a minimal or reserved price designated for an item being auctioned. The reserve price is not disclosed to the bidders but when the bidding has been completed, if the designated reserve price has not been met or exceeded, the auction is ended and the seller is not obligated to sell the item to the highest bidder since the designated reserve price was not met. During the auction, the bidders know that the item being auctioned has a reserve price that must be met or exceeded but they do not know the amount of the designated reserve price. The problem with reserve price auctions is that they can result in lost sales for the seller. None of the bidders knows that no one has met the reserve price until the auction has closed. There is no opportunity for a bidder to make a higher bid unless the seller sets up an entirely new auction. This requires additional time, effort and expense on the part of the seller. Further, on the second auction, there is a potential loss of bidders who participated in the first auction but did not return after the first auction ended.

Thus there is a need for an improved system and methodology by which auction sales may be extended beyond an initial auction period if a predetermined price for an auctioned item had not been met during the initial auction period.

SUMMARY OF THE INVENTION

A method and implementing system are provided in which items are offered for auction sale at a network site to bidders who access the auction site. A seller is enabled to designate a reserve price as well as a number of automatic auction extensions to an initial auction period. If the designated reserve price for an item is not met during the initial auction period, and the seller has authorized a designated number of auction extensions, the auction is continued beyond the initial auction period and is automatically extended for the designated number of extensions until either a bid for the reserve price is received or the number of authorized extensions has transpired.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

The various methods discussed herein may be implemented within a typical computer-related system or workstation which may be operating as a network server. In the example illustrated, a network server or auction site may be accessed through an interconnection network such as the Internet, by both the seller of an item to be auctioned as well as potential bidders for the auctioned item. In general, an implementing computer system such as the auction server may include a plurality of processors in a multi-bus system in a network of similar systems. However, since the workstation or computer system used in practicing the present invention in an exemplary embodiment, is generally known in the art and composed of electronic components and circuits which are also generally known to those skilled in the art, circuit details beyond those shown are not specified to any greater extent than that considered necessary as illustrated, for the understanding and appreciation of the underlying concepts of the present invention and in order not to obfuscate or distract from the teachings of the present invention.

Figure 1:
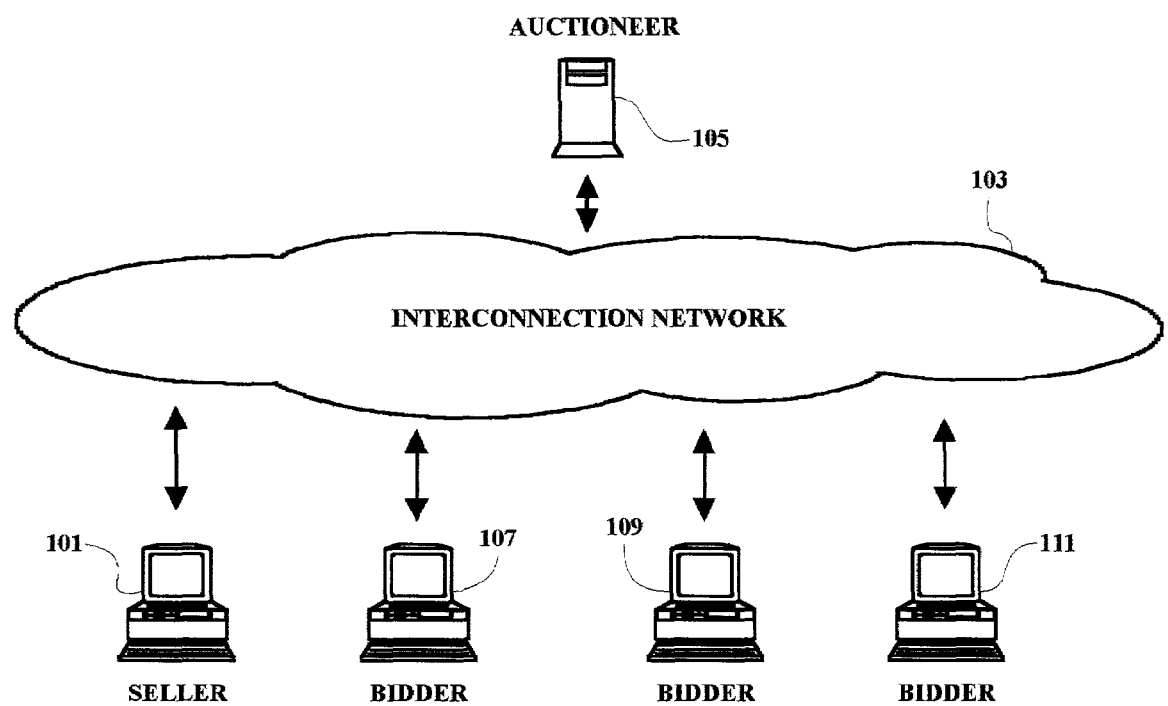
FIG. 1 is an illustration of an exemplary system in which the present invention may be implemented.

In FIG. 1, there is shown a seller terminal 101 which may be a personal computer (PC) or a laptop computer or a wireless or portable communication device such as a so-called PDA (personal digital assistant) or wireless palm-sized device or cellular phone. In general, any device may be used to access a network server which is running an auction process. For the sake of simplicity, a PC is shown in the illustrated example of FIG. 1. The seller terminal 101 is arranged to be connected through an interconnection network 103, such as the Internet, to an auctioneer server 105 which is enabled to run auction sales to accessing bidders, such as bidders 107, 109 and 111.

Figure 2:
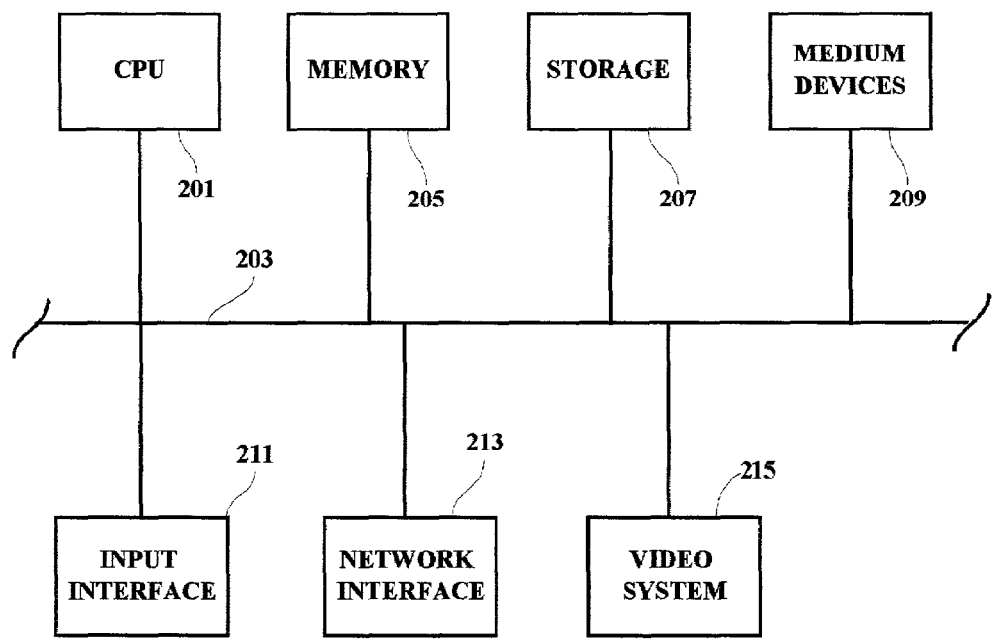
FIG. 2 is a schematic block diagram of several key components of a typical computer system.

In FIG. 2, there is illustrated a block diagram of several of the components of the network server 105, which may also be common the PC or other bidder terminals. As shown in the FIG. 2 example, a central processing unit (CPU) 201 is connected to a system bus 203. The system bus is also connected to a memory device 205, a storage system 207, and medium devices 209 such as diskette and/or CD drives. Also shown is an input interface 211 to enable a user or server administrator to interact with the server. In the seller or bidder terminals, the input interface enables the seller and the bidders to input information for the auction being conducted at the auctioneer server 105. The input interface 211 may be connected to a keyboard and/or a mouse or other pointing device as is well known. The system bus is also selectively coupled to a network interface 213 which may be used to connect the network server 105, for example, through the interconnection network 103 to the seller and bidder terminals 101, 107, 109 and 111. The exemplary block diagram of FIG. 2 also includes a video system 215 which is used to display the various screen displays and selection options to the seller as well as to the bidders during an auction process.

Figure 3:
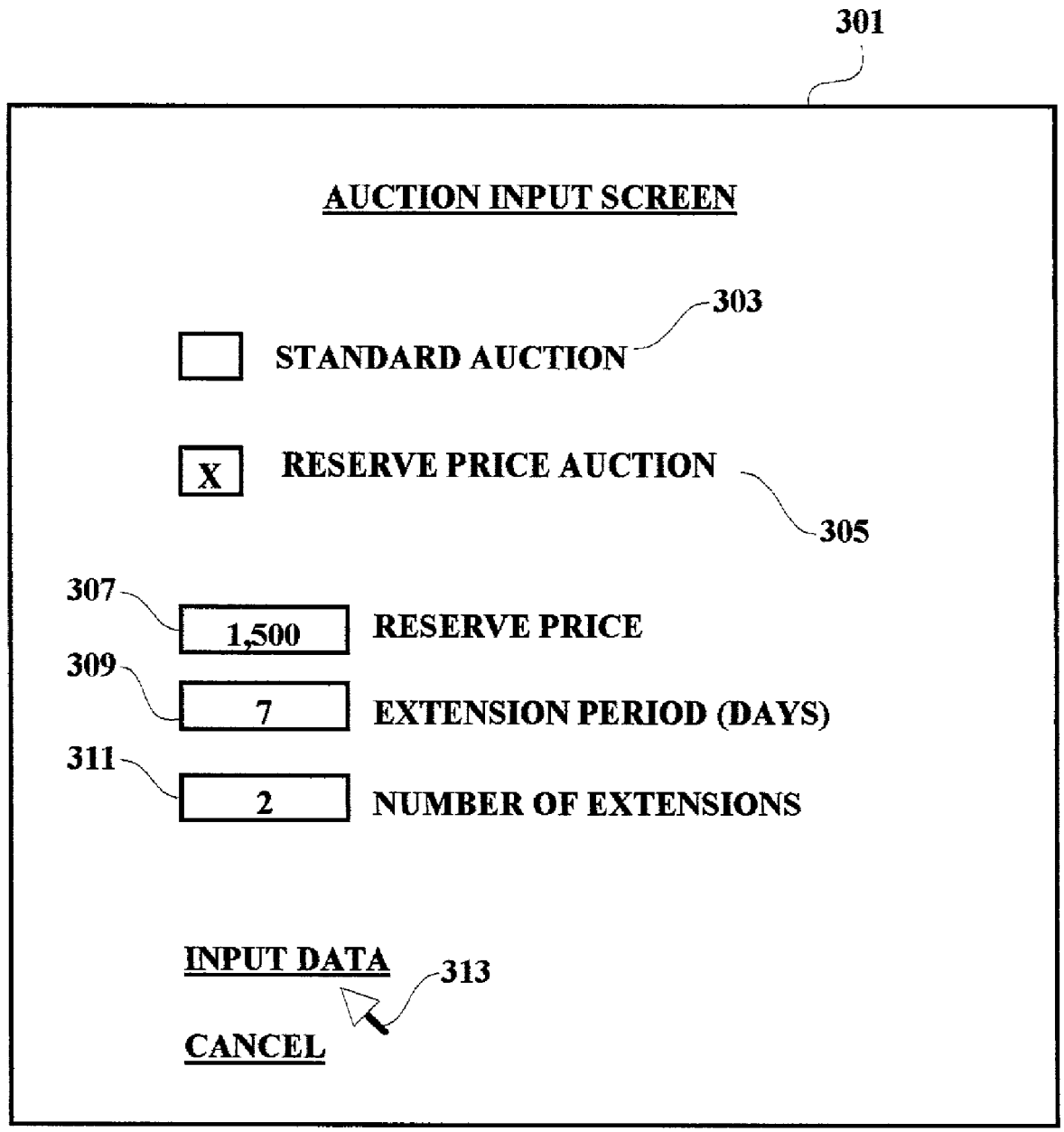
FIG. 3 is an illustration of an exemplary auction input screen.

In FIG. 3, there is shown an exemplary auction input screen 301 which may be displayed to a seller in order to enable the seller to input certain parameters and guidelines of the auction sale desired by the seller. In the example, the seller may designate whether the auction will be a so-called "standard" auction 303 or a reserve price auction 305. In accordance with the present invention, the reserve price auction enables a seller to designate and input a "reserve price" 307 for an item being auctioned. The reserve price is a price below which the seller has not obligation to sell the item being auctioned. The reserve price, in the example, is also a price which will determine whether or not an automatic extension of the auction sale will be executed if the reserve price is not met during an initial auction period. The input screen 301 also enables the seller to indicate the duration of each extension period 309 and also the number of extensions 311 which the seller will authorize. After making the appropriate designations on the input screen 301, the seller can either CANCEL the input, or select to input the data by "pointing and clicking" on the "INPUT DATA" hypertext with a mouse or other pointing device 313. After the seller inputs the indicated data, the auction will run its course in accordance with the seller's input instructions from the auction server 105.

Figure 4:
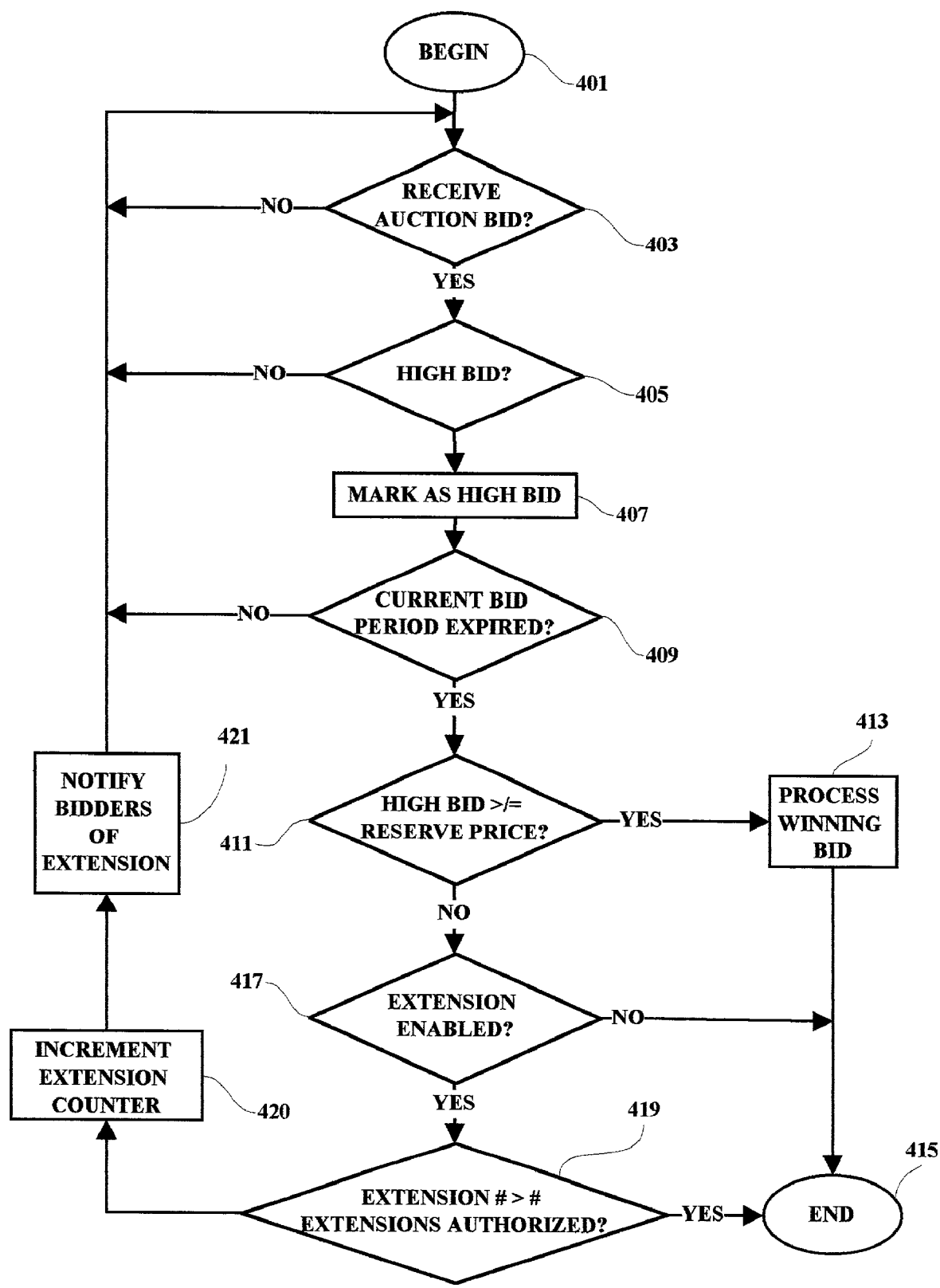
FIG. 4 is a detailed flow chart illustrating an exemplary operational sequence in one implementation of the present invention.

An exemplary auction process in accordance with the present invention is illustrated in FIG. 4. As the auction begins 401, when an auction bid is received 403, a check is made to determine if the received bid is a high bid 405, i.e. higher than previously received bids for the item being auctioned. If the bid is not a high bid 405, then the process returns to await the next bid 403. Once a new high bid is received 405, the bid is marked as the high bid 407, and a determination is made as to whether or not the current auction period has expired 409. If the current auction period has not yet expired 409, then the process returns to await subsequent bids 403. If, however, the current auction period has expired 409, then a check is made to determine if the highest received bid was higher than the designated reserve price 411. If the highest bid is higher than the seller designated reserve price 411 then there is a winning bidder, the winning bid is processed and the auction is ended 415. If, however, the high bid received during the initial auction period is not greater than or equal to the seller designated reserve price 411, then a check is made to determine if the seller has authorized an extension of the auction 417. If no extension has been authorized 417 then the auction is terminated 415. If however, the seller had previously authorized one or more extensions 417 in the event the reserve price was not met or exceeded during the initial auction period, and If the next extension number does not exceed the number of extensions authorized 419 by the seller, then an extension counter is incremented 420 and the auction is continued. The bidders, in the example, may then be notified of the extension of the auction 421 and the auction process automatically returns to receive subsequent bids 403. The notification to the bidders may be accomplished in any of many available forms including Instant messaging, email or by publication on a bulletin board. After the number of extensions equals the number of extensions authorized by the seller 419, then the auction process is terminated 415 without a winning bidder if none of the bids received during any extended auction period meets or exceeds the seller designated reserve price 411. During the bidding periods, the bidders may or may not be informed that the auction is a "reserve price" auction with the possibility of extensions, although in a preferred embodiment the bidders are notified when the auction has in fact been extended.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for conducting an auction for an item offered for sale, said method comprising:
designating a predetermined reserve price for said item;
receiving price bids from bidders for said item during an auction period;
determining that none of said price bids is equal to or greater than said predetermined reserve price;
a seller has a predetermined number of extentions determining that of said auction period of said item if none of said price bids was equal to or greater than said predetermined reserve price; and
automatically extending said auction period up to the predetermined number of extensions if said extensions of said auction period were authorized.

2. The method as set forth in claim 1 wherein said auction is conducted at an auction server, said bidders being selectively enabled to be connected to said auction server through an interconnection network.

3. The method as set forth in claim 2 wherein said interconnection network is an Internet interconnection network.

4. The method as set forth in claim 1 and further including:
enabling said seller to input parameters regarding said auction.

5. The method as set forth in claim 4 wherein said parameters are input by said seller using a computer device.

6. The method as set forth in claim 4 wherein said parameters are input by said seller using a wireless device.

7. The method as set forth in claim 4 wherein said auction is conducted at an auction server, and wherein at least one of said price bids being input by a bidder using a computer device.

8. The method as set forth in claim 4 wherein said auction is conducted at an auction server, and wherein at least one of said price bids being input by a bidder using a portable device.

9. The method as set forth in claim 4 wherein said auction is conducted at an auction server, and wherein at least one of said price bids being input by a bidder using a wireless device.

10. The method as set forth in claim 4 wherein said auction is conducted at an auction server, and wherein at least one of said price bids being input by a bidder using a wireless phone device.

11. The method as set forth in claim 1 and further including:

enabling said seller to designate a duration for said extension.

12. The method as set forth in claim 11 and further including:
enabling said seller to designate a number of extensions to be automatically executed so long as none of said price bids equaled or exceeded said predetermined reserve price.

13. The method as set forth in claim 1 and further including notifying said bidders of said extension.

14. A storage medium including machine readable coded indicia, said storage medium being selectively coupled to a reading device, said reading device being selectively coupled to processing circuitry within a computer system, said reading device being selectively operable to read said machine readable coded indicia and provide program signals representative thereof, said program signals being effective to enable an auction of an item offered for sale, said program signals being selectively operable for:
enabling a designation of a predetermined reserve price for said item;
receiving price bids from bidders for said item during an auction period;
determining that none of said price bids is equal to or greater than said predetermined reserve price;
a seller has authorized a predetermined number of extentions determining that of said auction period of said item if none of said price bids was equal to or greater than said predetermined reserve price; and
automatically extending said auction period up to the predetermined number of extensions if said extensions of said auction period were authorized.

15. The medium as set forth in claim 14 wherein said auction is conducted at an auction server, said bidders being selectively enabled to be connected to said auction server through an interconnection network.

16. The medium as set forth in claim 15 wherein said interconnection network is an Internet interconnection network.

17. The medium as set forth in claim 14 wherein said program signals are further effective for:
enabling said seller to input parameters regarding said auction.

18. The medium as set forth in claim 17 wherein said parameters are input by said seller using a computer device.

19. The medium as set forth in claim 17 wherein said parameters are input by said seller using a wireless device.

20. The medium as set forth in claim 17 wherein said auction is conducted at an auction server, and wherein at least one of said price bids being input by a bidder using a computer device.

21. The medium as set forth in claim 17 wherein said auction is conducted at an auction server, and wherein at least one of said price bids being input by a bidder using a portable device.

22. The medium as set forth in claim 17 wherein said auction is conducted at an auction server, and wherein at least one of said price bids being input by a bidder using a wireless device.

23. The medium as set forth in claim 17 wherein said auction is conducted at an auction server, and wherein at least one of said price bids being input by a bidder using a wireless phone device.

24. The medium as set forth in claim 14 wherein said program signals are further effective for:
enabling said seller to designate a duration for said extension.

25. The medium as set forth in claim 24 wherein said program signals are further effective for:
enabling said seller to designate a number of extensions to be automatically executed so long as none of said price bids equaled or exceeded said predetermined reserve price.

26. A computer system comprising:
a system bus;
a CPU device connected to said system bus;
a memory device connected to said system bus; and
connection means arranged to connect said computer system to a network, said computer system being arranged to conduct an auction of an item offered for sale over said network, said computer system further including input means by which said seller is enabled to designate a predetermined reserve price for said item, said computer system being selectively operable for receiving price bids from bidders for said item during an auction period and upon determining that none of said price bids is equal to or greater than said predetermined reserve price, to automatically extend said auction period for a predetermined extended period of time.

* * * * *